United States Patent
Oh

(10) Patent No.: US 10,113,689 B2
(45) Date of Patent: Oct. 30, 2018

(54) ELECTRONIC DEVICE MOUNTING APPARATUS FOR PHOTOGRAPHING GOLF SWING POSE

(71) Applicant: Se Hoon Oh, Los Angeles, CA (US)

(72) Inventor: Se Hoon Oh, Los Angeles, CA (US)

( * ) Notice: Subject to any disclaimer, the term of this patent is extended or adjusted under 35 U.S.C. 154(b) by 24 days.

(21) Appl. No.: 15/614,270

(22) Filed: Jun. 5, 2017

(65) Prior Publication Data

US 2018/0023760 A1    Jan. 25, 2018

(30) Foreign Application Priority Data

Jul. 20, 2016  (KR) .......................... 10-2016-0092058

(51) Int. Cl.
| | |
|---|---|
| *F16M 13/00* | (2006.01) |
| *F16M 13/02* | (2006.01) |
| *A63B 55/00* | (2015.01) |
| *F16M 11/04* | (2006.01) |
| *F16M 11/08* | (2006.01) |
| *H04M 1/04* | (2006.01) |
| *A63B 69/36* | (2006.01) |

(52) U.S. Cl.
CPC .......... *F16M 13/022* (2013.01); *A63B 55/408* (2015.10); *A63B 69/3632* (2013.01); *F16M 11/041* (2013.01); *F16M 11/046* (2013.01); *F16M 11/08* (2013.01); *H04M 1/04* (2013.01)

(58) Field of Classification Search
USPC ...... 248/124.2, 539, 540, 541, 230.1, 230.4, 248/231.51, 230.7
See application file for complete search history.

(56) References Cited

U.S. PATENT DOCUMENTS

| | | | |
|---|---|---|---|
| 7,106,273 B1 * | 9/2006 | Brunson | H01Q 1/1228 343/878 |
| 7,182,032 B1 * | 2/2007 | Lindemann | B63B 21/00 114/230.1 |
| 7,226,126 B1 * | 6/2007 | Spanovich | A47C 7/66 135/96 |
| 2003/0173484 A1 * | 9/2003 | Hsieh | F16M 11/28 248/291.1 |
| 2005/0035251 A1 * | 2/2005 | Wallin | A45B 1/00 248/230.1 |

* cited by examiner

*Primary Examiner* — Steven M Marsh
(74) *Attorney, Agent, or Firm* — Heedong Chae; Lucern, PC

(57) ABSTRACT

An electronic device mounting apparatus for photographing a golf swing pose includes a mounting assembly, having a first clamp having first and second gripping members pivotably coupled to a pivot pin. The first gripping member includes a first gripping groove and a first lever arm extending from the first gripping groove and the second gripping member includes a second gripping groove and a second lever arm extending from the second gripping groove. The mounting assembly further includes a second clamp having third and fourth gripping members pivotably coupled to the pivot pin. The third gripping member includes a third gripping groove and a third lever arm extending from the third gripping groove. The fourth gripping member includes a fourth gripping groove and a fourth lever arm extending from the fourth gripping groove.

20 Claims, 7 Drawing Sheets

10

ELECTRONIC DEVICE MOUNTING APPARATUS FOR PHOTOGRAPHING GOLF SWING POSE

CROSS-REFERENCE TO RELATED APPLICATION

This application claims the benefit of Korean Application No. 10-2016-0092058, filed on Jul. 20, 2016 with the Korean Intellectual Property Office, the disclosure of which is incorporated herein by reference.

FIELD OF THE INVENTION

The present invention relates to an electronic device mounting apparatus for photographing golf swing pose, and more particularly, to the electronic device mounting apparatus when a golfer take a photograph for the golfer's swing pose using the golfer's electronic device.

BACKGROUND OF THE INVENTION

Golf is a competitive sport, the object of which is to hit a golf ball with a golf club into a hole on a golf course in the fewest number of strokes. A golf novice or a golfer needing to improve or correct his golf swing may desire instruction from a professional or golf instructor; however, such instruction can be time consuming and expensive. Alternatively, the golfer may attempt to correct his golf swing by watching video or studying photographs of his own golf swing. Such video or photographs may be captured with an electronic device such as a camera, a smartphone, mobile phone, tablet computer, and the like.

Taking videos or pictures generally requires a second person to operate the electronic device. Otherwise, such videos or photographs may be self-shot. Conventionally, the electronic device for capturing self-shot video or photographs of a golf swing may be installed in a fixed position. The electronic device may be attached to a tripod or similar apparatus. However, self-shooting video or photographs of one's own golf swing may be cumbersome. For example, tripods may take up space not available in a golf driving range. Tripods and such apparatus may be heavy or awkward to carry around and set up on a golf course.

Therefore, to solve the above problems, there is a need for an electronic device mounting apparatus for photographing golf swing pose that has a simple and durable structure, and easy to use. This invention is directed to solve these problems and satisfy the long-felt need.

SUMMARY OF THE INVENTION

The present invention solves the above-mentioned problem by providing a golfer a compact apparatus to easily take his own golf swing video or photographs in any direction, anywhere without the assistance of others. The present invention provides a mounting assembly for holding an electronic device such as a camera, a smartphone, a mobile phone, a tablet computer, or the like. The mounting method may be coupled to a rod fixed to a golf bag.

An object of the present invention is to provide an electronic device mounting apparatus for photographing golf swing pose comprising: a mounting assembly, having a first clamp having first and second gripping members pivotably coupled to a pivot pin, wherein the first gripping member comprises a first gripping groove and a first lever arm extending from the first gripping groove, and wherein the second gripping member comprises a second gripping groove and a second lever arm extending from the second gripping groove, and a second clamp having third and fourth gripping members pivotably coupled to the pivot pin, wherein the third gripping member comprises a third gripping groove and a third lever arm extending from the third gripping groove, and wherein the fourth gripping member comprises a fourth gripping groove and a fourth lever arm extending from the fourth gripping groove, wherein the first and second gripping grooves are constructed to hold a rod, and wherein the third and fourth gripping grooves are constructed to hold an electronic device.

Another object of the present invention is to provide an electronic device mounting apparatus for photographing golf swing pose comprising: a cylindrical rod; and a mounting assembly, having a first clamp having first and second gripping members pivotably coupled to a pivot pin, wherein the first gripping member comprises a first gripping groove and a first lever arm extending from the first gripping groove, and wherein the second gripping member comprises a second gripping groove and a second lever arm extending from the second gripping groove, and a second clamp having third and fourth gripping members pivotably coupled to the pivot pin, wherein the third gripping member comprises a third gripping groove and a third lever arm extending from the third gripping groove, and wherein the fourth gripping member comprises a fourth gripping groove and a fourth lever arm extending from the fourth gripping groove, wherein the first and second gripping grooves are constructed to hold the cylindrical rod, wherein the third and fourth gripping grooves are constructed to hold an electronic device.

The advantages of the present invention are: (1) the mounting apparatus can be conveniently attached to a golf bag or any stuffs using an attachment means of a rod holder, or installed on a green using a rod; (2) an electronic device can be securely mounted on any place using the mounting apparatus and thus a golfer easily take a photograph his golf swing pose without anyone's help; (3) the first clamp and the second clamp of the present invention are pivotably coupled to a pivot pin with each other so that user can easily tilt the vertical angle of the electronic device by pivoting the first clamp; (4) the rod holder provides a ball and socket connection adjusting a direction of the rod holder and fixedly attaching the rod holder to a golf bag; (5) "U"-shaped the first clamp and "Y"-shaped the second clamp coupling to the pivot pin commonly provide a compact size and stylish structure to mounting the electronic device; (6) the second clamp structure receiving a rod holder therein by the receiving grooves when it is in closed position provides an easy carrying and storing the mounting apparatus; (7) the first clamps having the gripping grooves constructed to hold a cylindrical rod can be easily hold user's golf club having a cylindrical shaft; (8) the second clamps having the lever arms which has a greater angel between the lever arms than those angel of first clamp arms; and (9) the mounting apparatus is easy-to-use and convenient.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Also, as used in the specification including the appended claims, the singular forms "a", "an", and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

Additionally, words relating to photography herein may be understood as relating to photography or videography.

This application claims the benefit of Korean Application No. 10-2016-0092058, filed on Jul. 20, 2016 with the Korean Intellectual Property Office, the disclosure of which is incorporated herein by reference.

Figure 1:
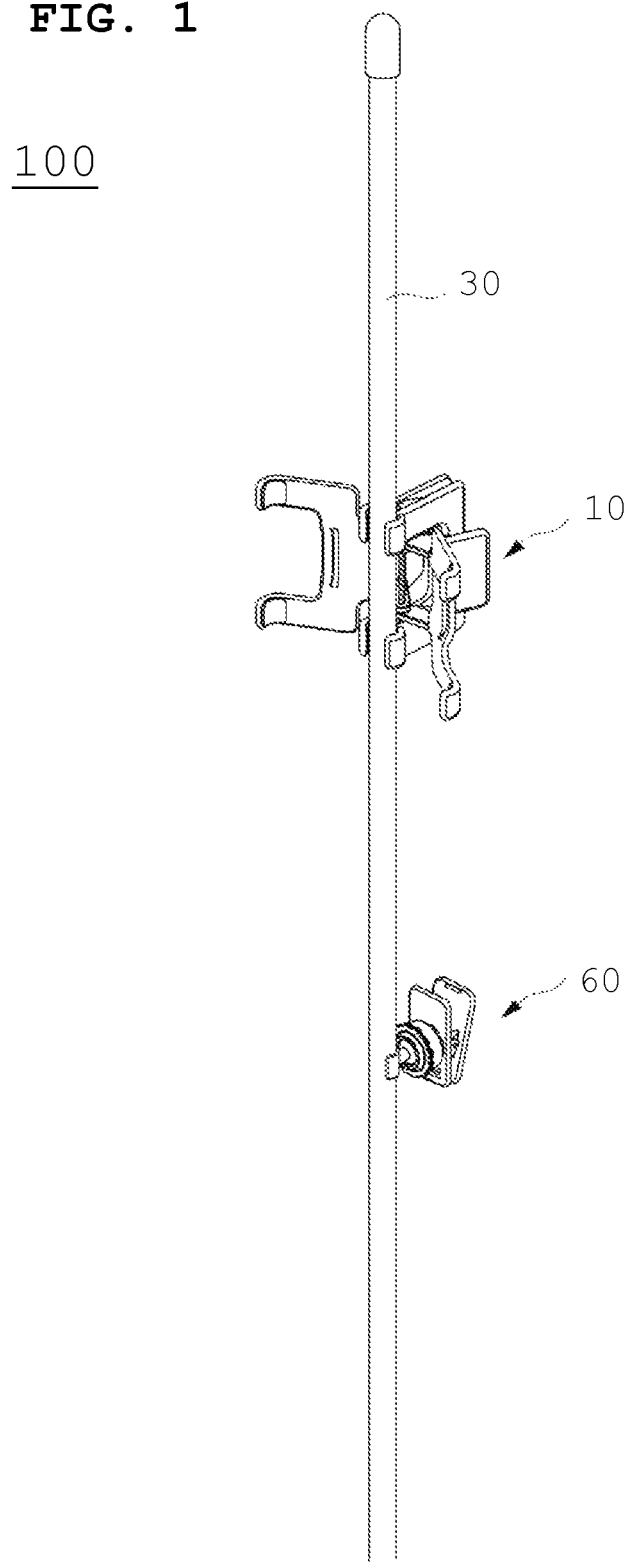
FIG. 1 shows a front perspective view of an electronic device mounting apparatus according to one embodiment of the present invention.
Figure 2:
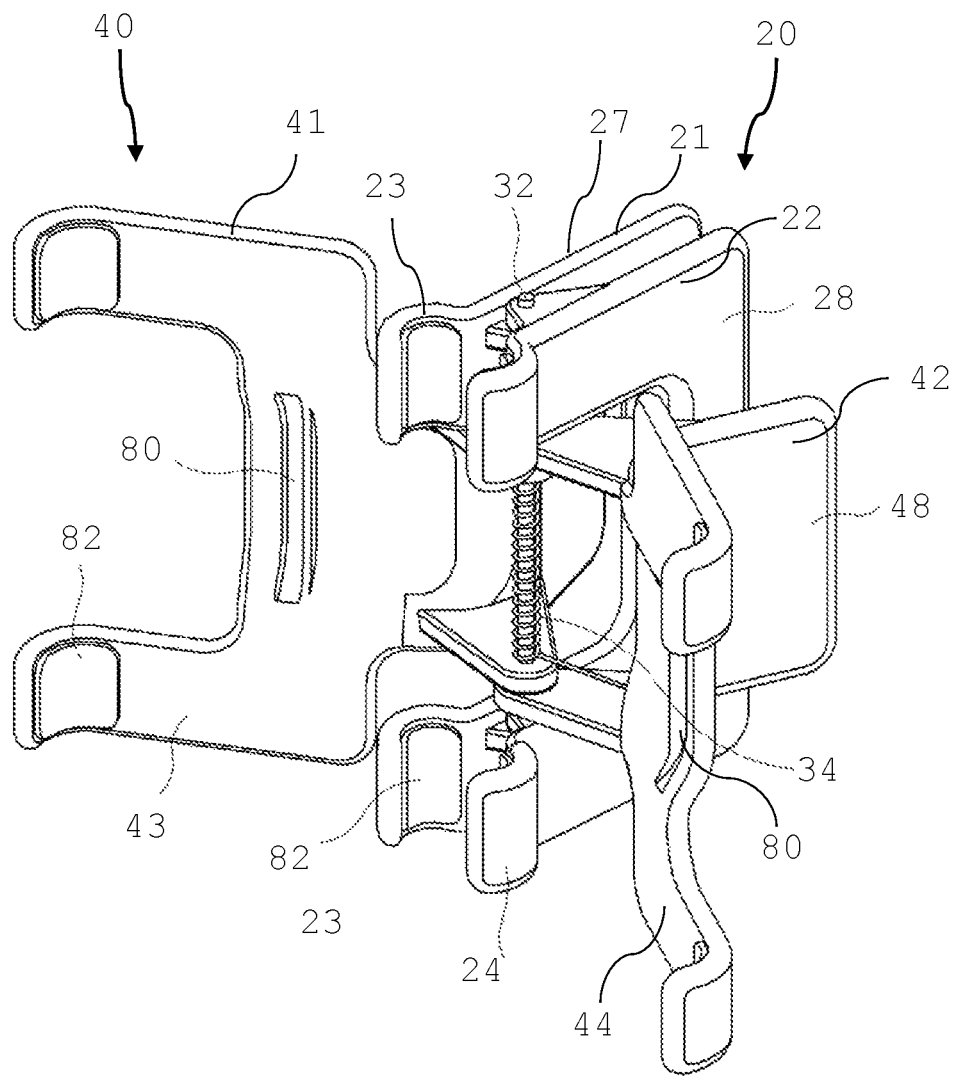
FIG. 2 shows a front perspective view of a mounting assembly of the electronic device mounting apparatus, a mounting assembly in an open position, according to one embodiment of the present invention.
Figure 3:
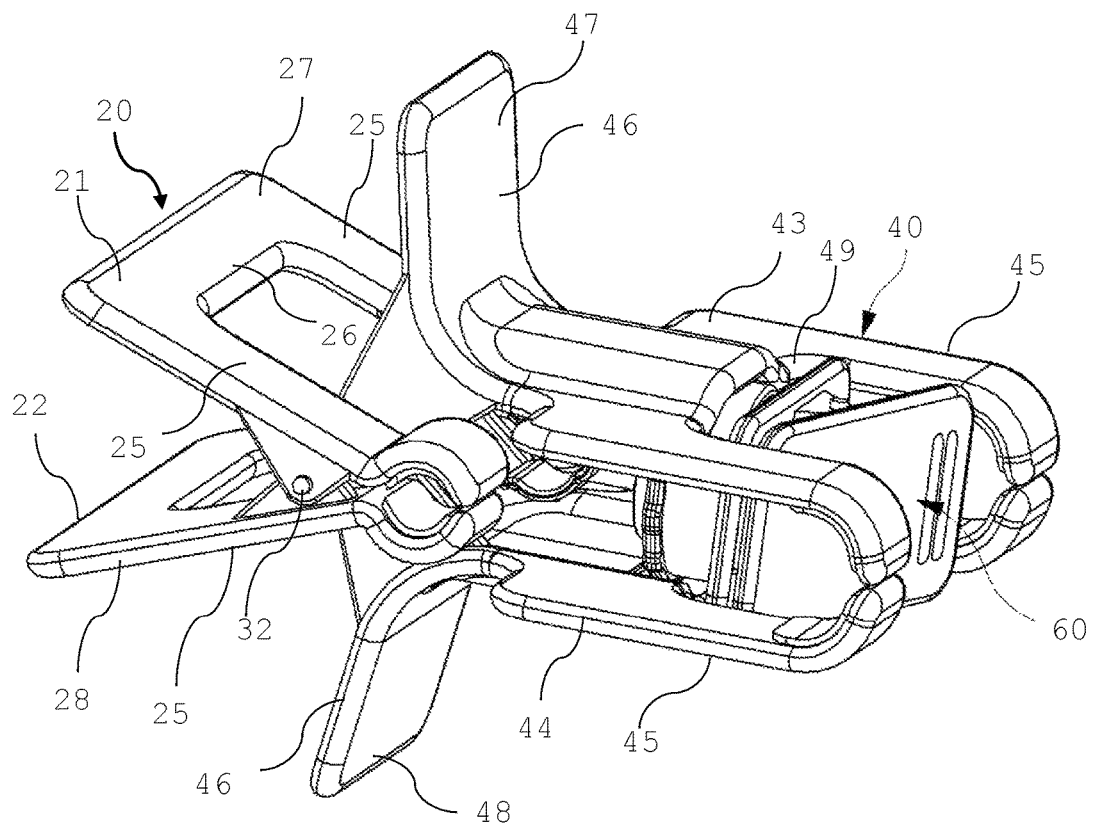
FIG. 3 shows a side perspective view of the mounting assembly of the electronic device mounting apparatus, the mounting assembly receiving a rod holder in an closed position, according to one embodiment of the present invention.

FIG. 1 shows a front perspective view of an electronic device mounting apparatus and FIG. 2 shows a front perspective view of a mounting assembly which in an open position of the electronic device mounting apparatus according to one embodiment of the present invention. In addition, FIG. 3 shows a side perspective view of the mounting assembly holding a rod holder in a closed position. The electronic device to be mounted may be a mobile phone, smart phone, tablet computer, MP3 player, personal digital assistant, or the like.

As shown in FIGS. 1-3, the electronic device mounting apparatus 100 for photographing golf swing pose may include: a mounting assembly 10, having a first clamp 20 having first and second gripping members 21 and 22 pivotably coupled to a pivot pin 32, wherein the first gripping member 21 may include a first gripping groove 23 and a first lever arm 27 extending from the first gripping groove 23, and wherein the second gripping member 22 may include a second gripping groove 24 and a second lever arm 28 extending from the second gripping groove 24; and a second clamp 40 having third and fourth gripping members 41 and pivotably coupled to the pivot pin 32, wherein the third gripping member 41 may include a third gripping groove 43 and a third lever arm 47 extending from the third gripping groove 43, and wherein the fourth gripping member 42 may include a fourth gripping groove 44 and a fourth lever arm 48 extending from the fourth gripping groove 44. In addition, the first and second gripping grooves 23 and 24 may be constructed to hold a rod 30, and wherein the third and fourth gripping grooves 43 and 44 may be constructed to hold an electronic device 200. Preferably, the rod 30 may have a circular cross-section 30 such as an aim or alignment stick for golf, a golf club, or the like. The rod 30 may be made of wood, steel, aluminum, another metal, PVC, another plastic, or the like.

In addition, the first and second gripping grooves 23 and of the first clamp 20 and the third and fourth gripping grooves 43 and 44 of the second clamp 40 may be disposed in the same direction from the pivot pin 32.

The first and second clamps 20 and 40 may be constructed so that the rod 30 may be disposed in between the third and fourth gripping members 41 and 42 of the second clamp 40 when the first and second gripping grooves 21 and 22 of the first clamp 20 hold the rod 30.

Furthermore, the angle between the third and fourth lever arms 47 and 48 of the second clamp 40 may be greater than the angle between the first and second lever arms 27 and 28 of the first clamp 20 when the second clamp 40 and the first clamp 20 are in closed positions.

As shown in FIGS. 2-3, the first and second gripping members 21 and 22 of the first clamp 20 are "U"-shaped such that the first and second gripping grooves 23 and 24 may be formed on two arms 25 of the "U"-shaped first and second gripping members 21 and 22, and the first and second lever arms 27 and 28 may be formed on a bottom portion 26 of the "U"-shaped first and second gripping members 21 and 22. The third and fourth gripping members 41 and 42 of the second clamp 40 may be "Y"-shaped such that the third and fourth gripping grooves 43 and 44 may be formed on two upper arms 45 of the "Y"-shaped third and fourth gripping members 41 and 42 and the third and fourth lever arms 47 and 48 may formed on a lower arm 46 of the "Y"-shaped third and fourth gripping members 41 and 42.

In addition, the first and second clamps 20 and 40 may be respectively pivotably coupled to the pivot pin 32 at the two arms 25 of the "U"-shaped first and second gripping members 21 and 22 and at the lower arm 46 of the "Y"-shaped third and fourth gripping members 41 and 42.

The lower arm 46 of the "Y"-shaped third and fourth gripping members 41 and 42 may be disposed in between the two arms 25 of the "U"-shaped first and second gripping members 21 and 22 at the pivot pin 32.

The first clamp 20 further may include two springs not shown in FIG. 34 and wherein the second clamp 40 further may include a spring 34. Preferably, the spring 34 may be a torsion spring, a helical spring, a coiled spring or the like.

The first, second, third and fourth gripping grooves 23, 24, 43 and 44 may include a slip-preventing pad 82 attached thereto. Preferably, the slip-preventing pad may be a rubber pad or a sponge pad or the like.

Figure 4:
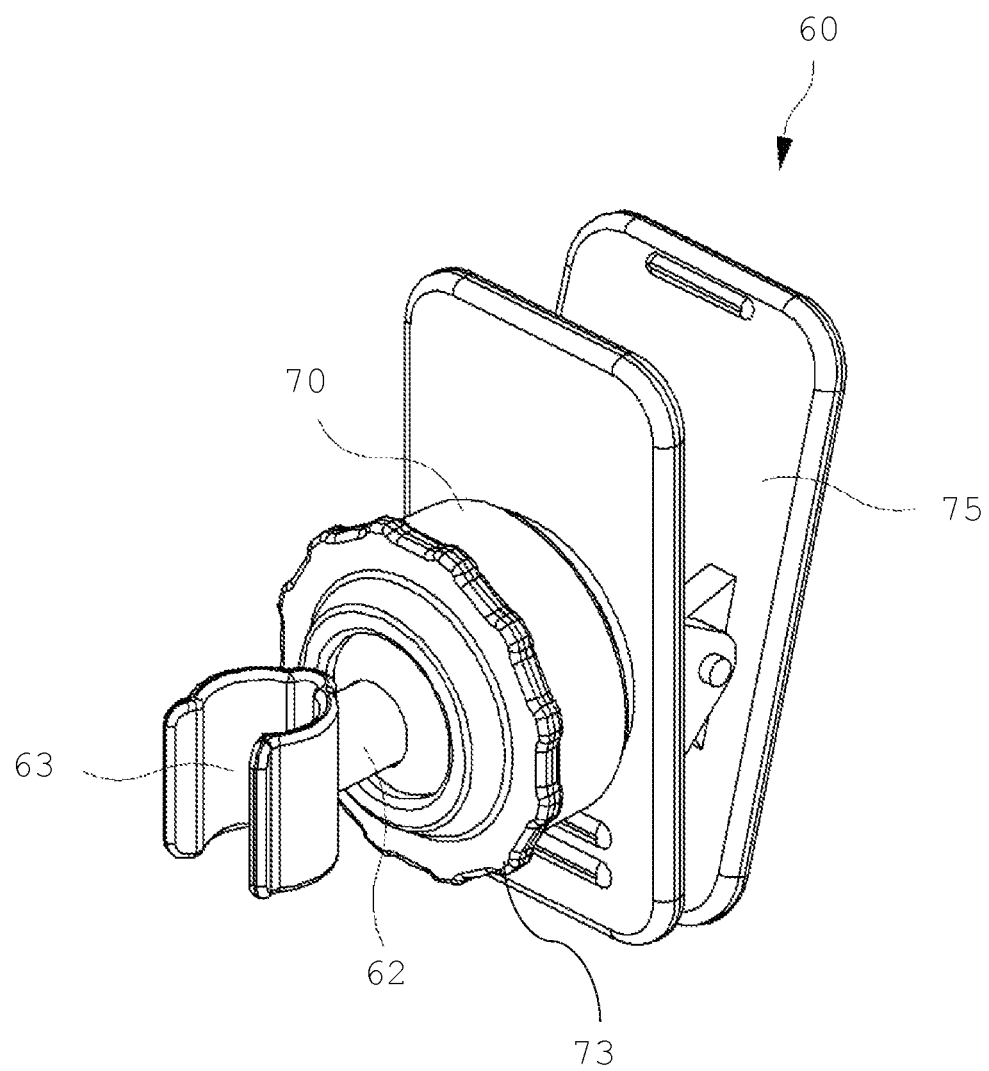
FIG. 4 shows a perspective view of the rod holder of the electronic device mounting apparatus, according to one embodiment of the present invention.
Figure 5:
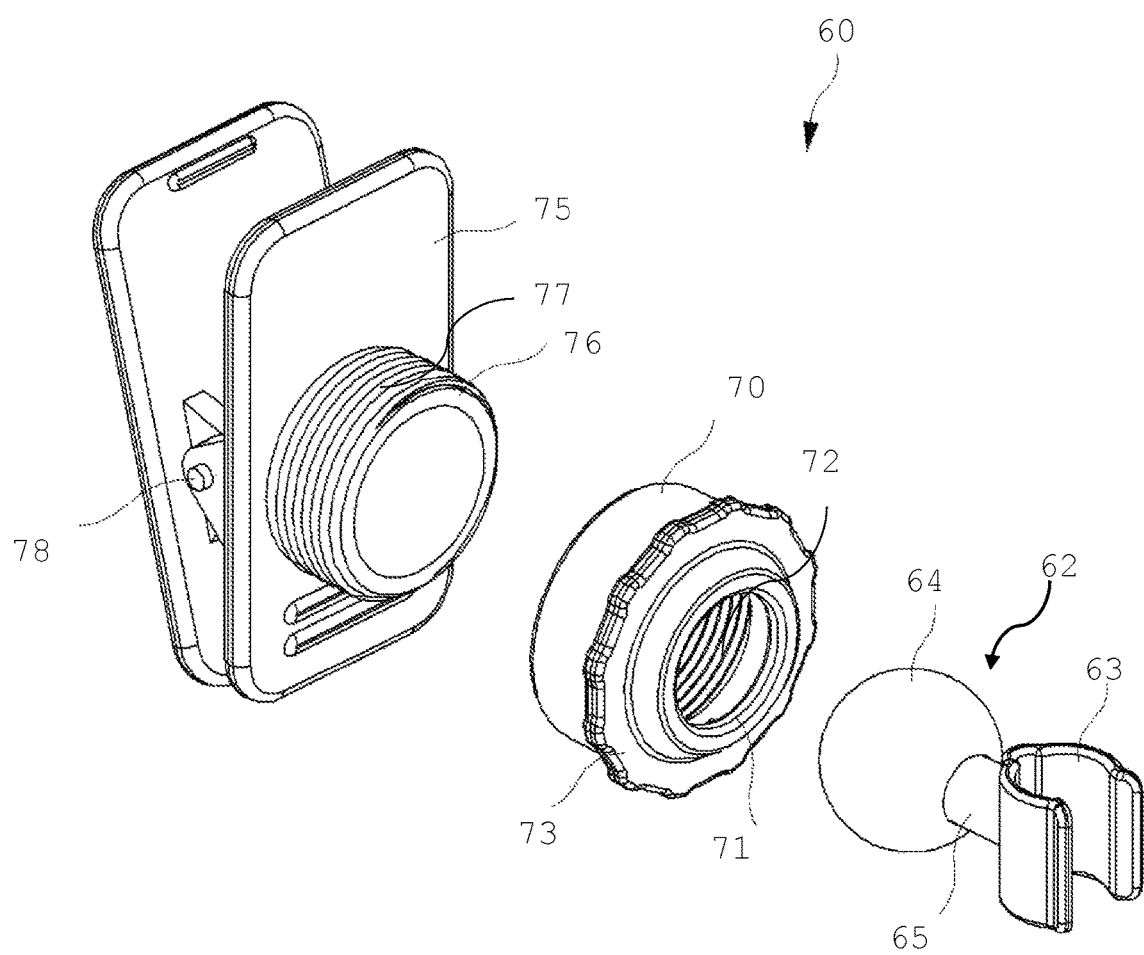
FIG. 5 shows an exploded perspective view of the rod holder of the electronic device mounting apparatus, according to one embodiment of the present invention.
Figure 6:
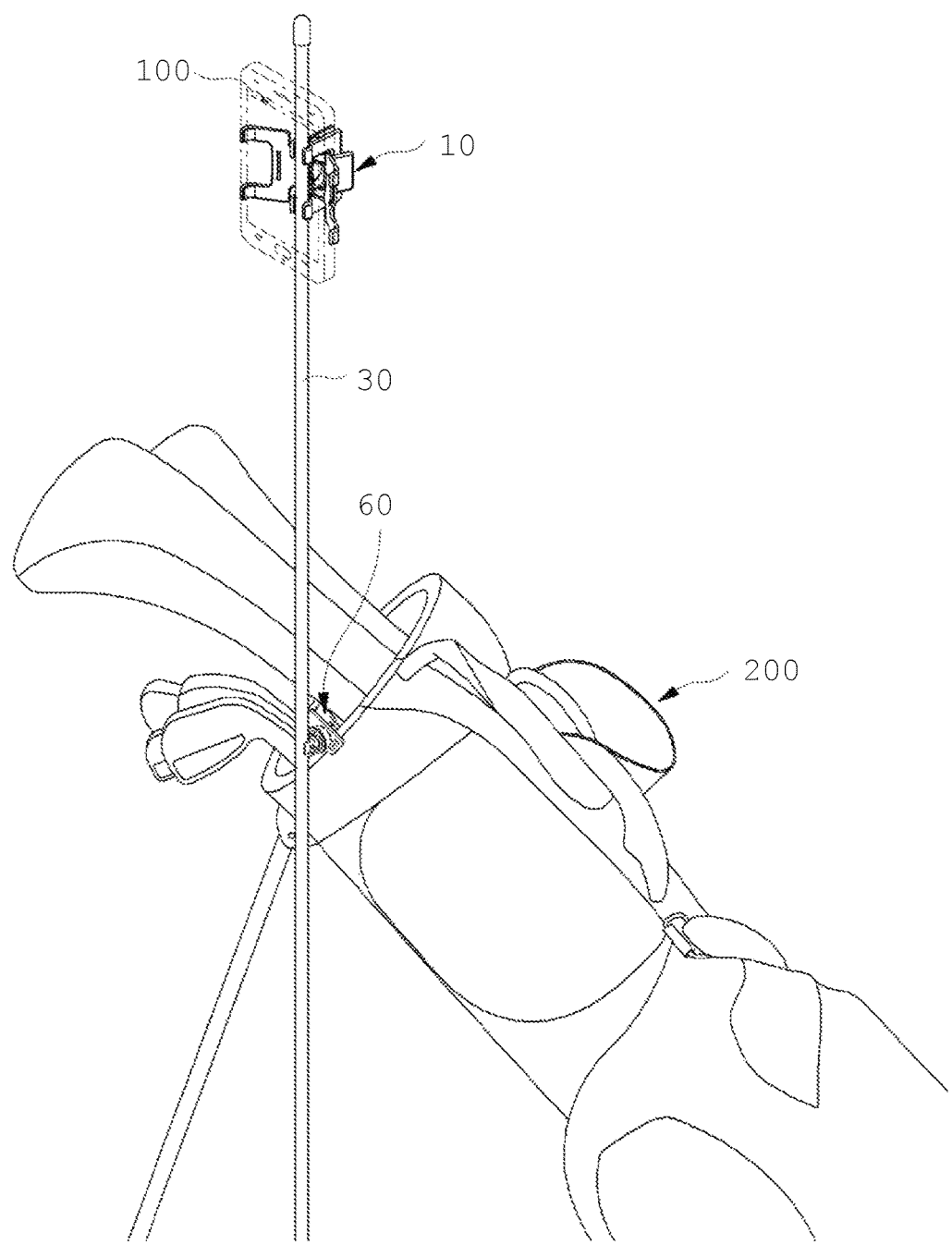
FIG. 6 shows a perspective view of the electronic device mounting apparatus which is attached to outside of a golf bag according to one embodiment of the present invention.
Figure 7:
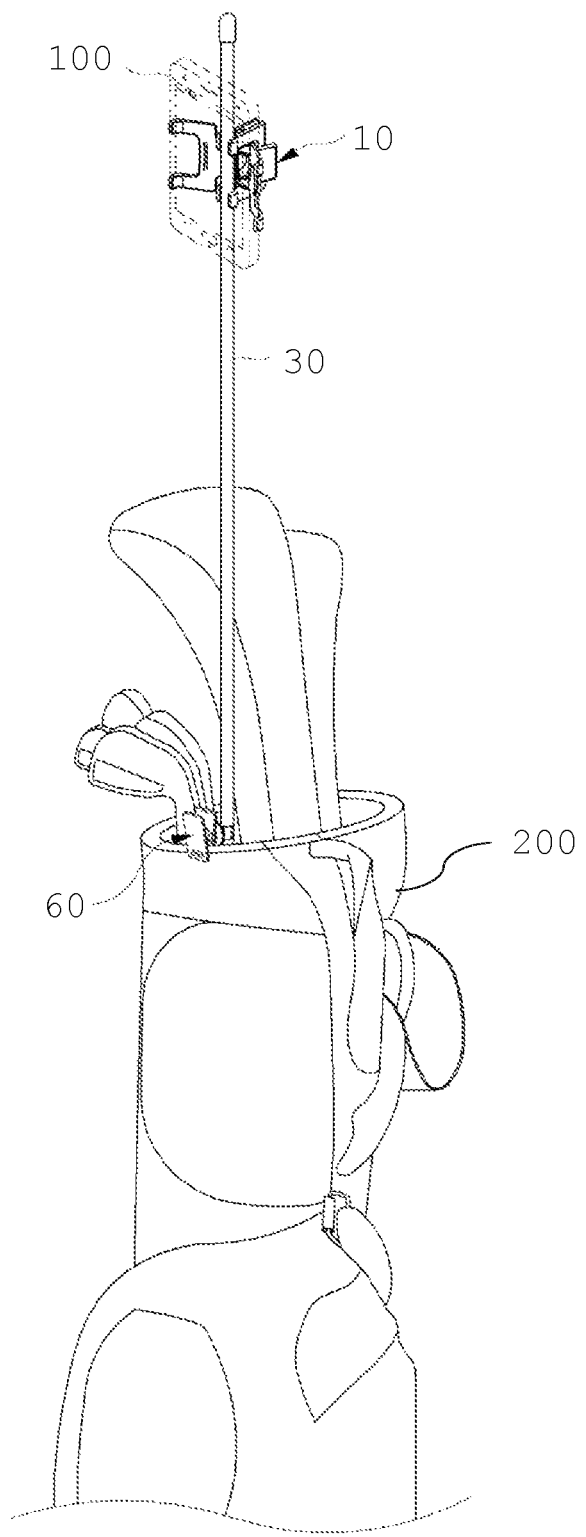
FIG. 7 shows a perspective view of the electronic device mounting apparatus which is attached to inside of a golf bag according to one embodiment of the present invention.

FIGS. 4 and 5 show a perspective view and a exploded perspective view of the rod holder of the electronic device mounting apparatus, according to one embodiment of the present invention.

As shown in FIGS. 4 and 5, the electronic device mounting apparatus 100 further including a rod holder 60, may include a rod clip 62 for holding the rod 30 and an attachment means 75 for attaching the rod holder 60 to a golf bag 300.

The rod clip 62 may be rotatably connected to the attachment means 75 such that a direction of the rod clip 62 can be adjusted. The rod clip 62 may include a clip 63, a ball 64, and an arm 65, wherein the rod holder 60 may include a socket 76, formed on the attachment means 75 to receive the ball 64, and a cover 70, constructed to be coupled to the socket 76 by a screw thread such that fastening the cover 70 to the socket 76 may increase friction between the ball 64 and the socket 75 to prevent rotational movement of the ball 64. Preferably, The rod clip 62 may be a cylindrical rod clip 62 and may be made of an elastic or flexible material enough to receive the rod and rigid enough to securely retain it.

Here, "rotatably connected" may be defined as connected as to allow rotation and pivoting of the rod clip 62 in any direction.

The clip 63 may be constructed to hold the rod 30 and the arm 65 may connect the clip 63 to the ball 64, wherein the cover 70 may include a circular opening 71 which may be sized to allow passage of the arm 65, but not to allow passage of the ball 64, and wherein the socket 76 may have a male thread 77 on its outer surface and the cover 70 may have a corresponding female thread 74 on its inner surface.

In addition, a flange 73 may be formed on the cover 70, and the second clamp 40 may include two receiving grooves 80 respectively formed on third and fourth gripping members 41 and 42, wherein the two receiving grooves 80 may be constructed to hold the flange 73 therein and thus hold the rod holder 60 therein when the second clamp 40 is in a closed position.

The rod holder 60 may include a flange 73 and the second clamp 40 may include two receiving grooves 80 respectively formed on third and fourth gripping members 41 and 42, wherein the two receiving grooves 80 may be constructed to hold the flange 73 therein and thus hold the rod holder 60 therein when the second clamp 40 may be in a closed position. Preferably, the location of the two receiving grooves may be in the "Y"-shaped clamp.

In the alternative embodiment, as shown in FIGS. 1-3, the electronic device mounting apparatus 100 for photographing golf swing pose including: a cylindrical rod 30; and a mounting assembly 10, having a first clamp 20 having first and second gripping members 21 and 22 pivotably coupled to a pivot pin 32, wherein the first gripping member 21 may include a first gripping groove 23 and a first lever arm 27 extending from the first gripping groove 23, and wherein the second gripping member 22 may include a second gripping groove 24 and a second lever arm 28 extending from the second gripping groove 24, and a second clamp 40 having third and fourth gripping members 41 and 42 pivotably coupled to the pivot pin 32, wherein the third gripping member 41 may include a third gripping groove 43 and a third lever arm 47 extending from the third gripping groove 43, and wherein the fourth gripping member 42 may include a fourth gripping groove 44 and a fourth lever arm 48 extending from the fourth gripping groove 44.

In addition, the first and second gripping grooves 23 and may be constructed to hold the cylindrical rod 30, and wherein the third and fourth gripping grooves 43 and 44 may be constructed to hold an electronic device 200. The electronic device may be a mobile phone, smart phone, tablet computer, MP3 player, personal digital assistant, or the like.

The first and second gripping grooves 23 and 24 of the first clamp 20 and the third and fourth gripping grooves 43 and 44 of the second clamp 40 may be disposed in the same direction from the pivot pin 32, wherein the first and second clamps 20 and 40 may be constructed so that the cylindrical rod 30 may be disposed in between the third and fourth gripping members 41 and 42 of the second clamp 40 when the first and second gripping grooves 23 and 24 of the first clamp 20 hold the cylindrical rod 30.

The first and second gripping members 21 and 22 of the first clamp 20 may be "U"-shaped such that the first and second gripping grooves 23 and 24 may be formed on two arms 25 of the "U"-shaped first and second gripping members 21 and 22 and the first and second lever arms 27 and 28 may be formed on a bottom portion 26 of the "U"-shaped first and second gripping members 21 and 22, and wherein the third and fourth gripping members 41 and 42 of the second clamp 40 may be "Y"-shaped such that the third and fourth gripping grooves 43 and 44 may be formed on two upper arms 45 of the "Y"-shaped third and fourth gripping members 41 and 42 and the third and fourth lever arms 47 and 48 may be formed on a lower arm 46 of the "Y"-shaped third and fourth gripping members 41 and 42.

The first and second clamps 20 and 40 may be respectively pivotably coupled to the pivot pin 32 at the two arms 25 of the "U"-shaped first and second gripping members 21 and 22 and at the lower arm 46 of the "Y"-shaped third and fourth gripping members 41 and 42, wherein the lower arm 46 of the "Y"-shaped third and fourth gripping members 41 and 42 may be disposed in between the two arms 25 of the "U"-shaped first and second gripping members 21 and 22 at the pivot pin 32.

As shown in FIGS. 4 and 5, the electronic device mounting apparatus 100 may further include a rod holder 60, which may include a rod clip 62 for holding the rod 30 and an attachment means 75 for attaching the rod holder 60 to a golf bag 200, wherein the rod holder 60 may further include a flange 73, wherein the second clamp 20 may include two receiving grooves 82 respectively formed on third and fourth gripping members 41 and 42, wherein the two receiving grooves 82 may be constructed to hold the flange 73 therein and thus hold the rod holder 60 therein when the second clamp 20 may be in a closed position such that the rod holder 60 may be held in between the two arms 25 of the "U"-shaped first and second gripping members 21 and 22.

Preferably, the rod 30 may be used with the electronic device mounting apparatus 100. However, the electronic device mounting apparatus 100 may be used without the rod 30 to prop up the electronic device in a vertical position. Such a use may be use may be preferred when photographing a putting stroke. Additionally, the rod holder 60 may not necessarily be attached to a golf bag 200, but may be attached to the back of a chair or the like. The rod 30 may include a pointed end, which may be used to spike the rod 30 into the ground. In such an embodiment, the rod holder 60 may not be necessary to attach the rod 30 to a golf bag 200.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. An electronic device mounting apparatus (100) for photographing golf swing pose comprising:
   a mounting assembly (10), having
       a first clamp (20) having first and second gripping members (21 and 22) pivotably coupled to a pivot pin (32), wherein the first gripping member (21) comprises a first gripping groove (23) and a first lever arm (27) extending from the first gripping groove (23), and wherein the second gripping member (22) comprises a second gripping groove (24) and a second lever arm (28) extending from the second gripping groove (24), and
       a second clamp (40) having third and fourth gripping members (41 and 42) pivotably coupled to the pivot pin (32), wherein the third gripping member (41) comprises a third gripping groove (43) and a third lever arm (47) extending from the third gripping groove (43), and wherein the fourth gripping member (42) comprises a fourth gripping groove (44) and a fourth lever arm (48) extending from the fourth gripping groove (44),
   wherein the first and second gripping grooves (23 and 24) are constructed to hold a rod (30), and
   wherein the third and fourth gripping grooves (43 and 44) are constructed to hold an electronic device (200).

2. The electronic device mounting apparatus (100) of claim 1, wherein the first and second gripping grooves (23 and 24) of the first clamp (20) and the third and fourth gripping grooves (43 and 44) of the second clamp (40) are disposed in the same direction from the pivot pin (32).

3. The electronic device mounting apparatus (100) of claim 2, wherein the first and second clamps (20 and 40) are constructed so that the rod (30) is disposed in between the third and fourth gripping members (41 and 42) of the second clamp (40) when the first and second gripping grooves (21 and 22) of the first clamp (20) hold the rod (30).

4. The electronic device mounting apparatus (100) of claim 2, wherein an angle between the third and fourth lever arms (47 and 48) of the second clamp (40) in a closed position is greater than an angle between the first and second lever arms (27 and 28) of the first clamp (20) in a closed position.

5. The electronic device mounting apparatus (100) of claim 1, wherein the first and second gripping members (21 and 22) of the first clamp (20) are "U"-shaped such that the first and second gripping grooves (23 and 24) are formed on two arms (25) of the "U"-shaped first and second gripping members (21 and 22) and the first and second lever arms (27 and 28) are formed on a bottom portion (26) of the "U"-shaped first and second gripping members (21 and 22), and wherein the third and fourth gripping members (41 and 42) of the second clamp (40) are "Y"-shaped such that the third and fourth gripping grooves (43 and 44) are formed on two upper arms (45) of the "Y"-shaped third and fourth gripping members (41 and 42) and the third and fourth lever arms (47 and 48) are formed on a lower arm (46) of the "Y"-shaped third and fourth gripping members (41 and 42).

6. The electronic device mounting apparatus (100) of claim 5, wherein the first and second clamps (20 and 40) are respectively pivotably coupled to the pivot pin (32) at the two arms (25) of the "U"-shaped first and second gripping members (21 and 22) and at the lower arm (46) of the "Y"-shaped third and fourth gripping members (41 and 42).

7. The electronic device mounting apparatus (100) of claim 6, wherein the lower arm (46) of the "Y"-shaped third and fourth gripping members (41 and 42) is disposed in between the two arms (25) of the "U"-shaped first and second gripping members (21 and 22) at the pivot pin (32).

8. The electronic device mounting apparatus (100) of claim 7, wherein the first clamp (20) further comprises two springs (34) and wherein the second clamp (40) further comprises a spring (34).

9. The electronic device mounting apparatus (100) of claim 1, wherein the first, second, third and fourth gripping grooves (23, 24, 43 and 44) comprise a slip-preventing pad (82) attached thereto.

10. The electronic device mounting apparatus (100) of claim 1, further comprising a rod holder (60), which comprises a rod clip (62) for holding the rod (30) and an attachment means (75) for attaching the rod holder (60) to a golf bag (300).

11. The electronic device mounting apparatus (100) of claim 10, wherein the rod clip (62) is rotatably and pivotably connected to the attachment means (75) such that the rod clip (62) can be rotated or pivoted with respect to the attachment means.

12. The electronic device mounting apparatus (100) of claim 10, wherein the rod clip (62) comprises a clip (63), a ball (64), and an arm (65), wherein the rod holder (60) comprises a socket (76), formed on the attachment means (75) to receive the ball (64), and a cover (70), constructed to be coupled to the socket (76) by a screw thread such that fastening the cover (70) to the socket (76) increases friction between the ball (64) and the socket (75) to prevent rotational movement of the ball (64).

13. The electronic device mounting apparatus (100) of claim 12, wherein the clip (63) is constructed to hold the rod (30) and the arm (65) connects the clip (63) to the ball (64),
   wherein the cover (70) comprises a circular opening (71) which is sized to allow passage of the arm (65), but not to allow passage of the ball (64), and
   wherein the socket (76) has a male thread (77) on an outer surface of the socket (76) and the cover (70) has a corresponding female thread (74) on an inner surface of the cover (70).

14. The electronic device mounting apparatus (100) of claim 12, wherein a flange (73) is formed on the cover (70) and the second clamp (40) comprises two receiving grooves (80) respectively formed on third and fourth gripping members (41 and 42), wherein the two receiving grooves (80) are constructed to hold the flange (73) therein and thus hold the rod holder (60) therein when the second clamp (40) is in a closed position.

15. The electronic device mounting apparatus (100) of claim 10, wherein the rod holder (60) comprises a flange (73) and the second clamp (40) comprises two receiving grooves (80) respectively formed on third and fourth gripping members (41 and 42), wherein the two receiving grooves (80) are constructed to hold the flange (73) therein and thus hold the rod holder (60) therein when the second clamp (40) is in a closed position.

16. An electronic device mounting apparatus (100) for photographing golf swing pose comprising:
   a cylindrical rod (30); and
   a mounting assembly (10), having
       a first clamp (20) having first and second gripping members (21 and 22) pivotably coupled to a pivot pin (32), wherein the first gripping member (21) comprises a first gripping groove (23) and a first lever arm (27) extending from the first gripping groove (23), and wherein the second gripping member (22) comprises a second gripping groove (24) and a second lever arm (28) extending from the second gripping groove (24), and a second clamp (40) having third and fourth gripping members (41 and 42) pivotably coupled to the pivot pin (32), wherein the third gripping member (41) comprises a third gripping groove (43) and a third lever arm (47) extending from the third gripping groove (43), and wherein the fourth gripping member (42) comprises a fourth gripping groove (44) and a fourth lever arm (48) extending from the fourth gripping groove (44), wherein the first and second gripping grooves (23 and 24) are constructed to hold the cylindrical rod (30), and wherein the third and fourth gripping grooves (43 and 44) are constructed to hold an electronic device (200).

17. The electronic device mounting apparatus (100) of claim 16, wherein the first and second gripping grooves (23 and 24) of the first clamp (20) and the third and fourth gripping grooves (43 and 44) of the second clamp (40) are disposed in the same direction from the pivot pin (32), wherein the first and second clamps (20 and 40) are constructed so that the cylindrical rod (30) is disposed in between the third and fourth gripping members (41 and 42) of the second clamp (40) when the first and second gripping grooves (23 and 24) of the first clamp (20) hold the cylindrical rod (30).

18. The electronic device mounting apparatus (100) of claim 16, wherein the first and second gripping members (21 and 22) of the first clamp (20) are "U"-shaped such that the first and second gripping grooves (23 and 24) are formed on two arms (25) of the "U"-shaped first and second gripping members (21 and 22) and the first and second lever arms (27 and 28) are formed on a bottom portion (26) of the "U"-shaped first and second gripping members (21 and 22), and wherein the third and fourth gripping members (41 and 42) of the second clamp (40) are "Y"-shaped such that the third and fourth gripping grooves (43 and 44) are formed on two upper arms (45) of the "Y"-shaped third and fourth gripping members (41 and 42) and the third and fourth lever arms (47 and 48) are formed on a lower arm (46) of the "Y"-shaped third and fourth gripping members (41 and 42).

19. The electronic device mounting apparatus (100) of claim 18, wherein the first and second clamps (20 and 40) are respectively pivotably coupled to the pivot pin (32) at the two arms (25) of the "U"-shaped first and second gripping members (21 and 22) and at the lower arm (46) of the "Y"-shaped third and fourth gripping members (41 and 42), wherein the lower arm (46) of the "Y"-shaped third and fourth gripping members (41 and 42) is disposed in between the two arms (25) of the "U"-shaped first and second gripping members (21 and 22) at the pivot pin (32).

20. The electronic device mounting apparatus (100) of claim 18, further comprising a rod holder (60), which comprises a rod clip (62) for holding the rod (30) and an attachment means (75) for attaching the rod holder (60) to a golf bag (200), wherein the rod holder (60) further comprises a flange (73), wherein the second clamp (20) comprises two receiving grooves (82) respectively formed on third and fourth gripping members (41 and 42), wherein the two receiving grooves (82) are constructed to hold the flange (73) therein and thus hold the rod holder (60) therein when the second clamp (20) is in a closed position such that the rod holder (60) is held in between the two arms (25) of the "U"-shaped first and second gripping members (21 and 22).

\* \* \* \* \*